United States Patent [19]

Pfeifer et al.

[11] 4,107,687
[45] Aug. 15, 1978

[54] RECORDING DEVICE

[75] Inventors: Josef Pfeifer, Unterhaching; Rudolf Paulus, Munich; Walter Gutmann, Lochhofen; Michael Resch, Munich, all Germany

[73] Assignee: AGFA-Gevaert, A.G., Leverkusen, Germany

[21] Appl. No.: 815,414

[22] Filed: Jul. 13, 1977

[30] Foreign Application Priority Data

Jul. 15, 1976 [DE] Fed. Rep. of Germany ....... 2631848

[51] Int. Cl.² .......................... G01D 9/42; B41B 13/10
[52] U.S. Cl. ..................................... 346/107 R; 354/5
[58] Field of Search .................... 346/107 R; 354/4, 5, 354/7

[56] References Cited

U.S. PATENT DOCUMENTS

| 3,832,488 | 8/1974 | Fahey et al. ........................ 354/7 X |
| 3,952,311 | 4/1976 | Lapeyre ........................ 346/107 R X |
| 4,000,495 | 12/1976 | Pirtle ........................ 346/107 R X |

Primary Examiner—George H. Miller, Jr.
Attorney, Agent, or Firm—Michael J. Striker

[57] ABSTRACT

An image is formed on a recording medium by illuminating a multitude of points on the surface of the recording medium to form lines of image points. Relative movement is effected between the recording medium and a plurality of light-emitting diodes. The light-emitting diodes are arranged in a plurality of rows. Each row extends parallel to the direction in which a line of image points to be formed upon the recording medium extends. The rows are arranged successively in the direction of relative movement. A plurality of projector lenses is operative for projecting reduced-scale images of the light emitted by the light-emitting elements of the plurality of rows onto a portion of the recording medium on which a single line of image points is to be formed. The projector lenses are arranged in a plurality of lens rows, each of which extends parallel to the direction of the line of image points to be formed. The lenses of each row project the light emitted by the elements of only a single respective one of the rows of light-emitting elements. Successive lenses within each lens row project onto the recording-medium line images of the light emitted by successive respective groups of the light-emitting elements of the associated row of light-emitting elements.

6 Claims, 5 Drawing Figures

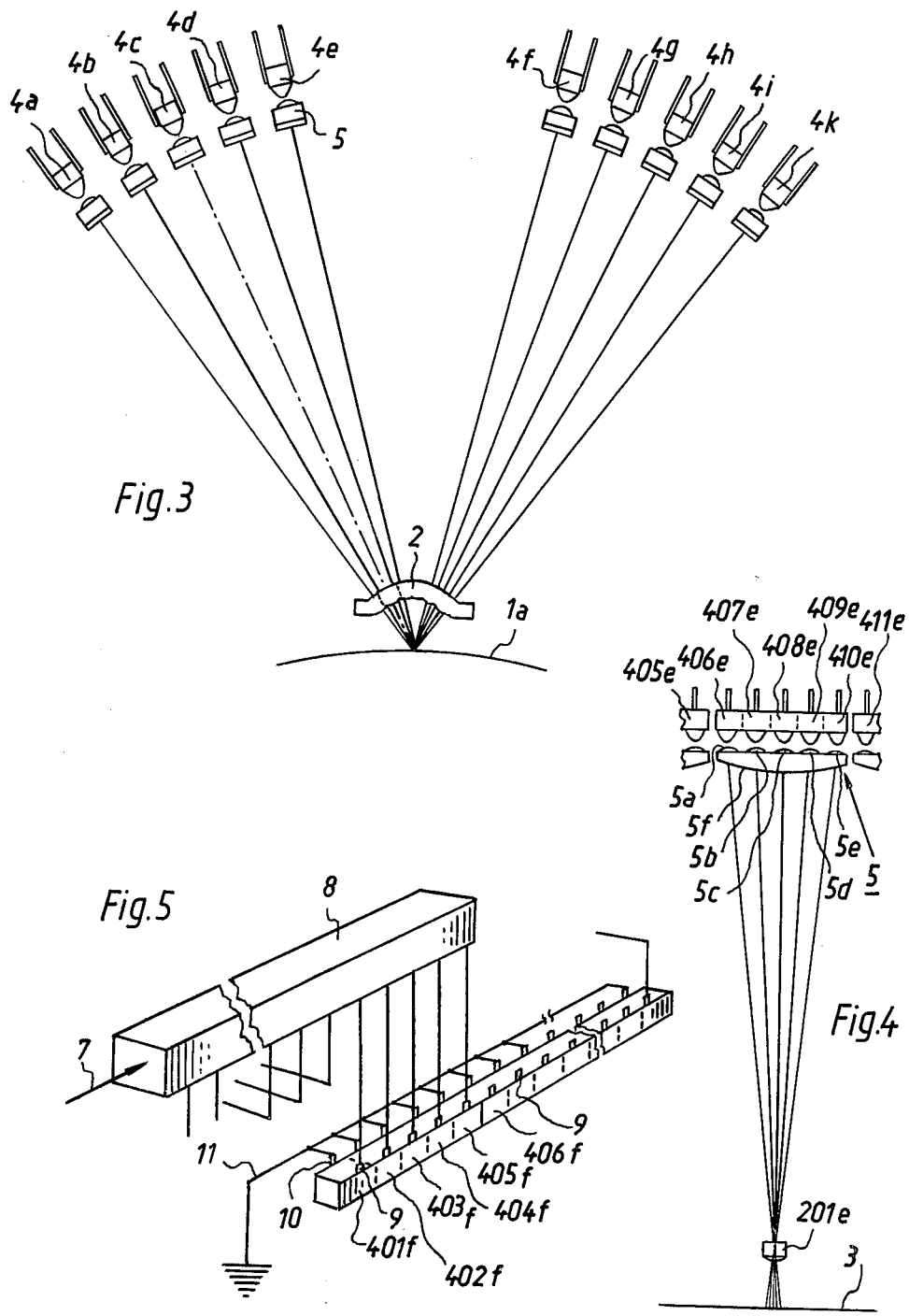

RECORDING DEVICE

BACKGROUND OF THE INVENTION

The invention relates to a recording device for the formation of an image on a recording medium by illuminating a multitude of point-like surface portions of the recording medium, to form an image consisting of lines of image points. The type of recording device in question uses individually energizable light-emitting elements, preferably light-emitting diodes (LED's) arranged above the recording medium.

A recording device of this type is disclosed, for example in Swiss Pat. No. 568,593. In that device, a row of LED's is arranged above the line on a recording medium on which a line of image points is to be formed, and the number of LED's in the LED-row is equal to the number of image points in a line of image points of the image to be formed. The relatively large dimensions of the LED's limit the number of LED's which can be provided in the LED-row, and correspondingly limit the image resolution which can be attained.

SUMMARY OF THE INVENTION

It is the general object of the invention to provide a recording device of the type in question but of considerably increased image resolution.

According to one concept of the invention, this can be achieved by arranging the LED's in a plurality of LED-rows, each extending parallel to the single line of image points to be formed, the LED-rows being arranged successively in the transport direction. A plurality of projector lenses is provided, arranged in lens rows likewise extending parallel to the single line of image points to be formed, and likewise arranged successively in the transport direction. The projector lenses project reduced scale images of the light emitted by the LED's of all the LED-rows onto the single line on the recording-medium on which a single line of image points is to be formed. The projector lenses of each row project onto the recording-medium line the light emitted by the LED's of only one respective LED-row. Successive projector lenses within each single lens row project only the light emitted by successive respective groups of the LED's within the single associated LED-row.

The reduced-scale projection of the light from the LED's onto the recording-medium line makes it possible to project onto that line light from a number of LED's considerably greater than could be contained within a single row of LED's, and accordingly makes it possible to produce a line of image points containing a very large number of very closely spaced image points.

The problems of space limitation and projector-lens overcrowding which could result if a large number of projector lenses were to be arranged close to the recording-medium line are avoided by using each projector lens to simultaneously project the light emitted from a plurality of LED's. Accordingly, relative to the total number of LED's provided, the total number of projector lenses is quite small. The relatively small number of projector lenses can be located very readily in the immediate vicinity of the recording-medium line.

With these preferred concepts, the number of LED's which can be utilized to form a single line of image points on the recording-medium can easily be made a multiple of the number of LED's which could be utilized in prior-art devices, resulting in a resolution increase corresponding to such multiple.

Preferably, the LED-rows and the projector lens rows are arranged in a cylindrical geometry, i.e., all LED-rows being equidistant to the recording-medium line, and all lens rows being equidistant to recording-medium line. Advantageously, each LED is provided with a field lens between it and the associated projector lens, to optimally utilize the emitted light for image formation.

From the viewpoint of manufacture, assembly and post-assembly fine-adjustment, it is particularly simple and preferable to provide the plurality of projector lenses in the form of lenticular portions of a single, one-piece lenticular bar.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is an axial end view of the structure shown in FIG. 1;

FIG. 4 depicts the cooperation between five LED's of one of the LED-rows in FIG. 1 and the associated projector lens; and FIG. 5 schematically depicts the manner in which the individual LED's can be controlled.

DESCRIPTION OF THE PREFERRED EMBODIMENTS

Figure 1:
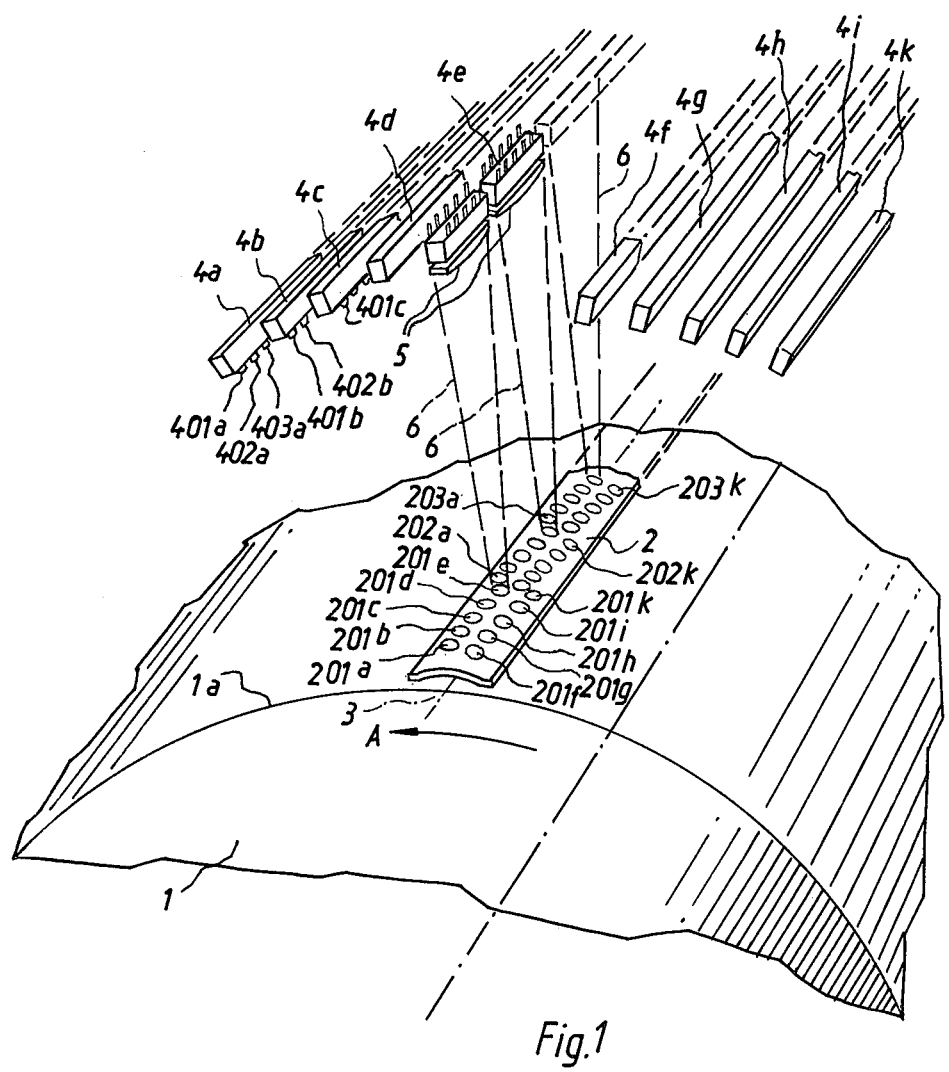
FIG. 1 depicts an exemplary embodiment of an inventive recording device.

In FIG. 1, numeral 1a denotes the light-sensitive surface of a copying drum 1 which is transported in the direction of arrow A; i.e., the rotating drum 1 transports the light-sensitive material 1a thereon. This possibility will be understood to be merely exemplary. A one-piece lenticular bar 2 of generally cylindrical shape is arranged with its cylinder-axis coincident with the line 3 on surface 1a on which a line of image points is to be formed. The lenticular elements of the one-piece lenticular bar 2 are arranged in ten parallel rows, each containing seventeen individual projector lenses 201a – 217a, 201b – 217b, ..., 201k – 217k.

Ten rows 4a to 4k of LED's are arranged with uniform angular spacing relative to the recording-medium line 3, all equidistant from line 3, i.e., in a cylindrical arrangement; the LED-rows 4a to 4k are uniformly spaced apart at intervals of about 50 mm.

Each LED-row 4a to 4k contains 85 LED's, denoted 401a – 485a, 401b – 485b, ..., 401k – 485k. The distance between adjoining LED's within any single row equals 2.54 mm.

Figure 2:
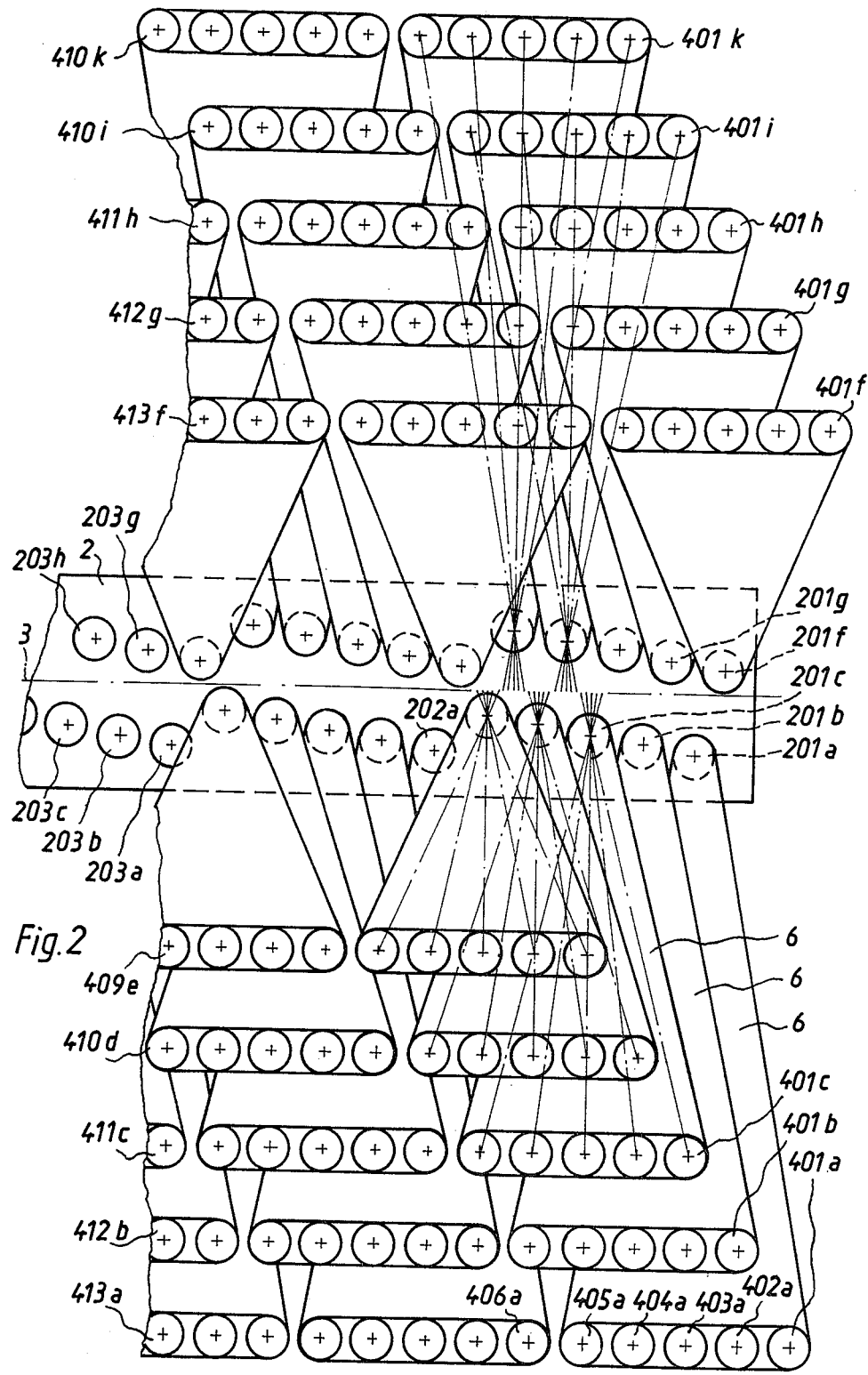
FIG. 2 is a top view of the structure shown in FIG. 1.

Each of the LED-rows 4a to 4e is offset relative to the adjoining one of rows 4a to 4e by an amount equal to the inter-LED spacing, i.e., 2.54 mm; this can be seen particularly clearly in FIG. 2. Each of the LED-rows 4f to 4k is likewise offset relative to the adjoining ones of the rows 4f to 4k by the amount of the inter-LED spacing, 2.54 mm. However, the LED-rows 4a to 4e are offset relative to the LED-rows 4f to 4k by an amount equal to one half the inter-LED spacing, i.e., 1.27 mm. The offsets are in the axial direction.

Each five successive LED's within an LED-row (e.g., 401e – 405e, 406e – 410e, etc., in LED-row 4e) is provided with a respective lens unit 5, as shown particularly clearly in FIG. 4. Each lens unit 5 comprises five spherical component lenses 5a – 5e and a cylindrical lens 5f.

Associated with each such group of five LED's and the respective field-lens unit 5 is a single respective projector lens, in the form of one of the lenticular elements 201a to 217k of lenticular bar 2.

Each of these projector lenses 201a to 217k is so arranged on the lenticular bar 2 that its optical axis coincides with the optical axis of the middle component lens 5c of the associated field-lens units, and intersects the recording-medium line 3 normal thereto; this can be clearly seen in FIGS. 3 and 4. Accordingly, the light emitted by each group of five LED's (e.g., 406e – 411e in FIG. 4) is projected at reduced scale onto successive adjoining portions of the recording-medium line 3.

The light path of each group of five LED's is isolated from the light paths of all the other five LED groups by means of a respective light chute 6; to avoid overcrowding only three such light chutes 6 are shown in FIG. 1, but in FIG. 2 the light chutes 6 for all LED-groups shown therein are expressly depicted.

The coordination between the individual LED-groups and the corresponding projector lenses is as follows: The light from each successive group of five LED's in LED-row 4a is projected by successive respective ones of the projector lenses 201a, 202a, . . . , 217a. The light from each successive group of five LED's in LED-row 4b is projected by successive respective ones of the projector lenses 201b, 202b, . . . , 217b. Etc. More particularly, the first five LED's 401a – 405a cooperate with projector lens 201a, the next five LED's 406a – 410a cooperate with projector lens 202a, etc.

In this way the light from all 850 LED's is simultaneously projected onto the single recording-medium line 3 in accordance with the following scheme:

LED's 401f – 405f by projector lens 201f
LED's 401a – 405a by projector lens 201a
LED's 401g – 405g by projector lens 201g
LED's 401b – 405b by projector lens 201b
LED's 401h – 405h by projector lens 201h
LED's 401c – 405c by projector lens 201c
LED's 401i – 405i by projector lens 201i
LED's 401d – 405d by projector lens 201d
LED's 401k – 405k by projector lens 201k
LED's 401e – 405e by projector lens 201e
LED's 406f – 410f by projector lens 202f
LED's 406a – 410a by projector lens 202a
LED's 406g – 410g by projector lens 202g, etc.

In the illustrative embodiment, the light spot of each LED, when projected onto the recording-medium line 3, is scale-reduced by 10:1. Accordingly, the individual light points projected onto the single recording-medium line 3 can be uniformly spaced at intervals of 0.254 mm. This amounts to about four light points, and therefore four image points, per millimeter, a degree of resolution which meets the needs, for example, of facsimile-recording systems.

It will be appreciated that, despite the somewhat complicated-looking organization of the LED's in FIG. 2, the routing of control signals corresponding to a single line of image points to be formed is simple. The light spots formed by all the 850 LED's are projected onto the single recording-medium line 3 simultaneously. Accordingly, the 850 control signals (digital or analog) corresponding to each successive line of image points to be formed can be applied to the 850 LED's simultaneously. FIG. 5 schematically depicts one way of doing this.

In FIG. 5, each successive group of 850 control signals (digital or analog) corresponding to a respective one of a succession of image lines (lines of image points) to be formed, is serially written-in into an 850-stage shift register 8 via a serial-write-in line 7. The 850 read-out lines for the 850 shift-register stages (only a few shown in FIG. 5) are connected to appropriate respective ones of the terminals 9 of the 850 LED's — i.e., in accordance with the scheme tabulated above and depicted in FIG. 2. The other terminals 10 of the 850 LED's are connected in common to ground, via a line 11. After the 850 control signals for one line of image points have been registered by shift register 8, the shift register is read out, and the line of image points is formed. Then, the next 850 control signals, for the next line of image points, is entered into the shift register 8 and, after the recording-medium has advanced a distance equal to the spacing between adjoining image lines, read-out of the shift register 8 is again effected, and so forth.

The illustrative embodiment is the preferred embodiment, because of its high degree of orderliness and regularity. It is easy to visualize, and if for example one of the 850 LED's is malfunctioning, it is quite easy to trace the malfunctioning LED. However, it will be appreciated that the organization of LED's, LED-rows and LED-groups within individual LED-rows as shown in FIG. 2, as well as the organization of the field lens units 5 and the projector lenses 201a to 217k could be modified in a very great variety of ways. In principle, these elements could be organized with a comparatively high degree of disorderliness and irregularity, i.e., not in simple straight rows extending perpendicular to the transport direction, not with uniform spacing, not with uniform offsets, etc. It is emphasized that such disorderly and irregular alternatives, although not preferred, do fall within the spirit and scope of the invention.

It will be understood that each of the elements described above, or two or more together, may also find a useful application in other types of constructions and circuits differing from the types described above.

While the invention has been illustrated and described as embodied in a LED recorder in which the LED's are organized in an orderly and regular manner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a recorder of the type operative for forming an image on a recording-medium by illuminating a multitude of points on the surface of the recording-medium to form lines of image points, in combination, a plurality of light-emitting elements; transport means for effecting relative movement between the light-emitting elements and a recording-medium in a predetermined transport direction, the light-emitting elements being arranged distributed both in the transport direction and in a direction transverse to the transport direction; and a plurality of projector lenses operative for simultaneously projecting reduced-scale images of the light emitted by all of the light-emitting elements onto a portion of the recording-medium on which a single line of image points is to be formed, the plurality of light-emitting elements being constituted by groups of light-emitting elements, each group of light-emitting elements containing a plurality of light-emitting elements distributed in a direction transverse to the transport direction, each projector lens being dimensioned and oriented to project onto said portion of the recording-medium images of the light emitted by a respective one of the groups of light-emitting elements.

2. In a recorder as defined in claim 1, the light-emitting elements being arranged in a plurality of rows, each row extending parallel to the direction in which a line of image points to be formed upon the recording-medium extends, the rows being arranged successively in the transport direction, the projector lenses being arranged in a plurality of lens rows, each lens row extending parallel to the direction in which a line of image points to be formed upon the recording medium extends, the lens rows being arranged successively in the transport direction, the lenses of each lens row being oriented to project onto said portion images of the light emitted by the light-emitting elements of a single respective one of the rows of light-emitting elements, successive ones of the lenses within each single lens row being dimensioned and oriented to project onto said portion images of the light emitted by successive respective groups of the light-emitting elements of the associated row of light-emitting elements.

3. In a recorder as defined in claim 2, the successive rows of light-emitting elements all being equally spaced from the portion of the recording-medium on which a single line of image points is to be formed, the successive rows of lenses all being equally spaced from the portion of the recording-medium on which a single line of image points is to be formed.

4. In a recorder as defined in claim 2, further including a plurality of field lenses, one for each individual light-emitting element, each field lens being positioned intermediate the respective light-emitting element and the respective projector lens.

5. In a recorder as defined in claim 2, the plurality of projector lenses constituting different lenticular portions of a one-piece lens bar.

6. In a recorder as defined in claim 2, the light-emitting elements being light-emitted diodes.

* * * * *